United States Patent [19]
Pedicini et al.

[11] Patent Number: 5,919,582
[45] Date of Patent: Jul. 6, 1999

[54] DIFFUSION CONTROLLED AIR VENT AND RECIRCULATION AIR MANAGER FOR A METAL-AIR BATTERY

[75] Inventors: Christopher S. Pedicini, Canton; John D. Witzigrueter, Dallas, both of Ga.

[73] Assignee: AER Energy Resources, Inc., Smyrna, Ga.

[21] Appl. No.: 08/556,613

[22] Filed: Nov. 13, 1995

Related U.S. Application Data

[63] Continuation-in-part of application No. 08/544,707, Oct. 18, 1995, Pat. No. 5,691,074.

[51] Int. Cl.⁶ .................................................. H01M 12/06
[52] U.S. Cl. .................................. 429/27; 429/71; 429/83
[58] Field of Search ............................ 429/27, 71, 83

[56] References Cited

U.S. PATENT DOCUMENTS

| | | |
|---|---|---|
| 971,737 | 10/1910 | Ekströmer . |
| 2,468,430 | 4/1949 | Derksen . |
| 3,072,284 | 1/1963 | Luhman ................................. 220/44 |
| 3,124,487 | 3/1964 | Duddy et al. . |
| 3,160,528 | 12/1964 | Dengler et al. . |
| 3,436,270 | 4/1969 | Oswin et al. ......................... 136/120 |
| 3,473,963 | 10/1969 | Sanderson . |
| 3,532,548 | 10/1970 | Stachurski ............................ 136/164 |
| 3,533,845 | 10/1970 | Katsoulis . |
| 3,600,233 | 8/1971 | Coffey et al. ........................ 136/166 |
| 3,615,860 | 10/1971 | Teriecke ................................ 136/107 |
| 3,716,413 | 2/1973 | Eisner . |
| 3,744,516 | 7/1973 | Rowe .................................... 137/587 |
| 3,871,920 | 3/1975 | Grebier et al. ........................ 136/86 |
| 3,909,302 | 9/1975 | Mermelstein ......................... 136/177 |
| 3,975,210 | 8/1976 | Warnock ................................. 136/86 |
| 3,977,901 | 8/1976 | Buzzelli ................................. 136/86 |
| 4,112,198 | 9/1978 | Przybyla et al. ..................... 429/27 |
| 4,112,199 | 9/1978 | Dunlop et al. ....................... 429/29 |
| 4,118,544 | 10/1978 | Przybyla et al. ..................... 429/27 |
| 4,152,489 | 5/1979 | Chottiner ............................... 429/27 |
| 4,177,327 | 12/1979 | Mathews et al. . |
| 4,180,624 | 12/1979 | Winsel . |
| 4,246,324 | 1/1981 | de Nora et al. ....................... 429/17 |
| 4,298,666 | 11/1981 | Taskier ................................ 429/206 |
| 4,359,510 | 11/1982 | Taskier ................................ 429/144 |
| 4,457,215 | 7/1984 | Vogt . |
| 4,484,691 | 11/1984 | Lees ...................................... 220/89 |
| 4,521,497 | 6/1985 | Tamminen . |
| 4,591,539 | 5/1986 | Oltman et al. . |
| 4,626,482 | 12/1986 | Hamlen et al. ....................... 429/27 |
| 4,729,930 | 3/1988 | Beal et al. . |
| 4,745,038 | 5/1988 | Brown .................................. 429/27 |
| 4,823,679 | 4/1989 | Robbins . |
| 4,894,295 | 1/1990 | Cheiky . |
| 4,913,983 | 4/1990 | Cheiky ................................. 429/13 |
| 4,950,561 | 8/1990 | Niksa, et al. ......................... 429/27 |
| 5,024,904 | 6/1991 | Curiel .................................. 429/27 |
| 5,080,005 | 1/1992 | Kolt . |
| 5,084,364 | 1/1992 | Quaadvliet ........................... 429/34 |
| 5,141,826 | 8/1992 | Böhm et al. . |
| 5,183,222 | 2/1993 | Ramsey . |
| 5,191,274 | 3/1993 | Lloyd et al. . |
| 5,196,275 | 3/1993 | Goldman et al. .................... 429/27 |
| 5,206,576 | 4/1993 | Jasinski . |
| 5,208,526 | 5/1993 | Goldman et al. ..................... 320/2 |
| 5,258,239 | 11/1993 | Kobayashi . |
| 5,260,144 | 11/1993 | O'Callaghan ........................ 429/14 |
| 5,306,579 | 4/1994 | Shepard, Jr. et al. ............... 429/40 |
| 5,318,861 | 6/1994 | Harats et al. ........................ 429/21 |
| 5,328,777 | 7/1994 | Bentz et al. .......................... 429/27 |
| 5,328,778 | 7/1994 | Woodruff et al. ................... 429/27 |
| 5,354,625 | 10/1994 | Bentz et al. .......................... 429/17 |
| 5,356,729 | 10/1994 | Pedicini ............................... 429/27 |
| 5,362,577 | 11/1994 | Pedicini ............................... 429/27 |
| 5,366,822 | 11/1994 | Korall et al. ........................ 429/27 |
| 5,387,477 | 2/1995 | Cheiky ................................. 429/26 |
| 5,418,080 | 5/1995 | Korall et al. ........................ 429/27 |
| 5,447,805 | 9/1995 | Harats et al. ........................ 429/27 |
| 5,456,994 | 10/1995 | Mita ..................................... 429/71 |
| 5,506,067 | 4/1996 | Tinker . |
| 5,554,452 | 9/1996 | Delmolino et al. . |
| 5,560,999 | 10/1996 | Pedicini et al. . |
| 5,567,114 | 10/1996 | Wallace . |
| 5,569,551 | 10/1996 | Pedicini et al. . |
| 5,571,630 | 11/1996 | Cheiky ............................. 429/27 X |
| 5,691,074 | 11/1997 | Pedicini . |

FOREIGN PATENT DOCUMENTS

| | | |
|---|---|---|
| 0 294 327 | of 1988 | European Pat. Off. . |
| 0 476 484 | 9/1991 | European Pat. Off. . |
| 1 575 640 | of 1969 | France . |
| 2353142 | 12/1977 | France . |

| | | |
|---|---|---|
| 50-40773 | 12/1995 | Japan . |
| 90 11625 | of 1990 | WIPO . |

OTHER PUBLICATIONS

R.E. Biddick et al., *Non–Reserve Primary Zinc–Air Batteries*; believed to have been published more than one year prior to Oct. 18, 1995.

*Primary Examiner*—Stephen Kalafut
*Attorney, Agent, or Firm*—Jones & Askew, LLP

[57] ABSTRACT

A ventilation system for a metal-air battery having a housing for enclosing at least one metal-air cell. The housing has at least one air inlet opening and at least one air outlet opening. A fan is positioned to force air into the air inlet opening and out of the air outlet opening when the fan is turned on. The openings are sized with a length in the direction through the thickness of the housing being greater than a width in the direction perpendicular to the thickness of the housing. The openings are unobstructed and are sized to eliminate substantially the air flow into the air inlet opening and out of the air outlet opening when the fan is turned off. According to another aspect of the invention, a fan within the battery housing is positioned to distribute air to two separate sets of metal-air cells at the same time. In this configuration, all cells of both sets of cells receive air quickly, and the air received is richer in oxygen because the air paths are shorter than in previous configurations utilizing the same number of cells.

64 Claims, 4 Drawing Sheets

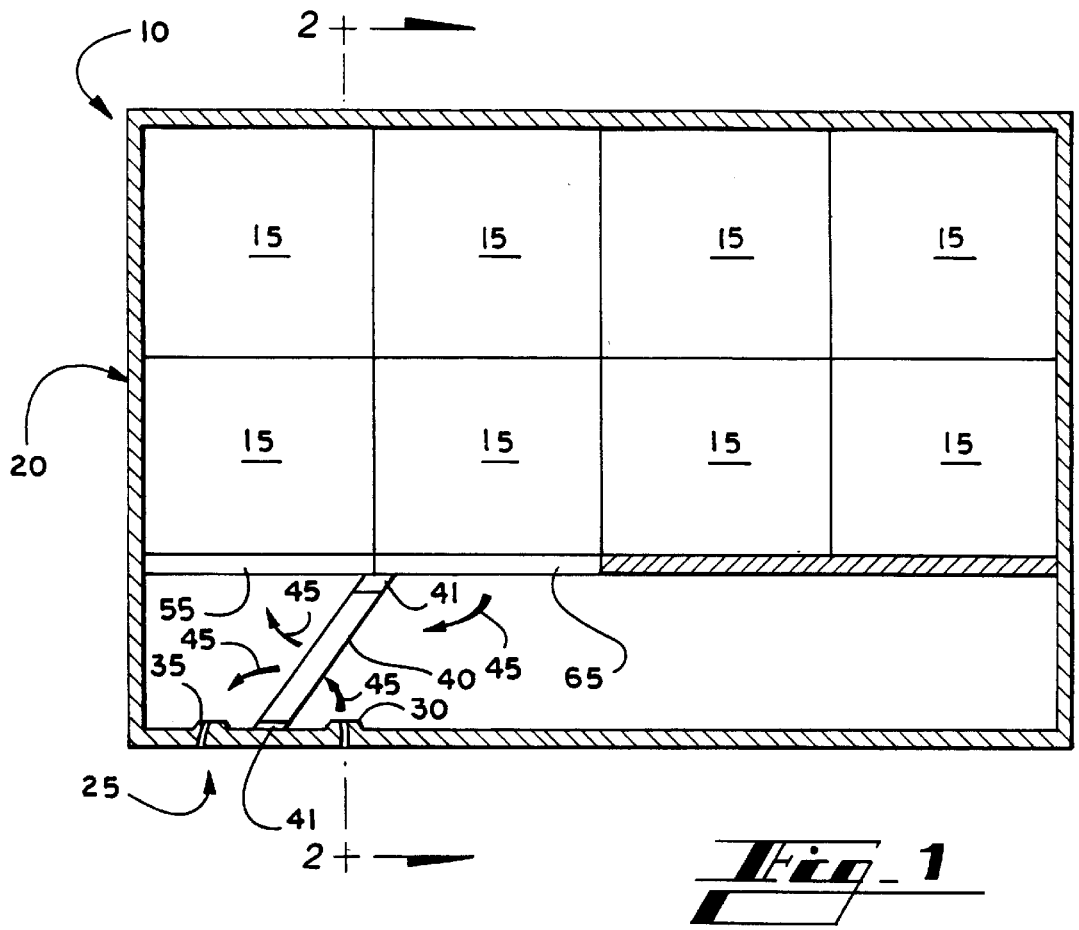
_Fig_1
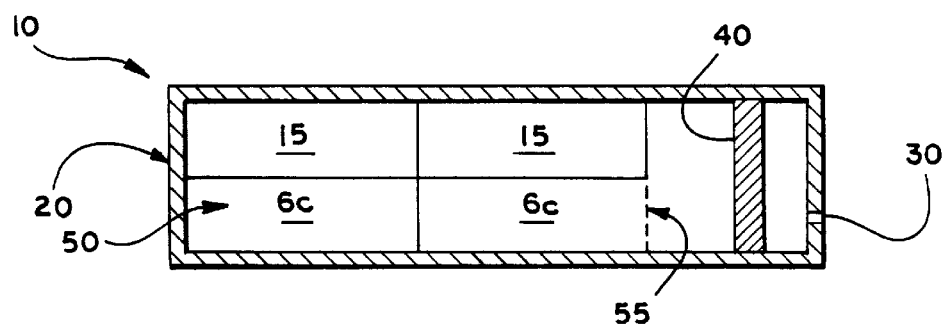
_Fig_2
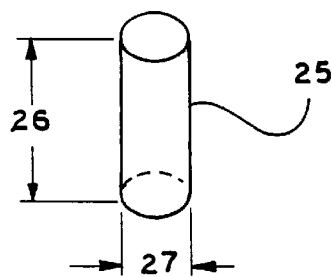
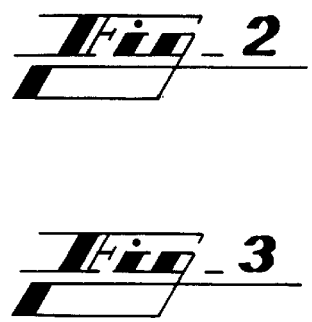
_Fig_3

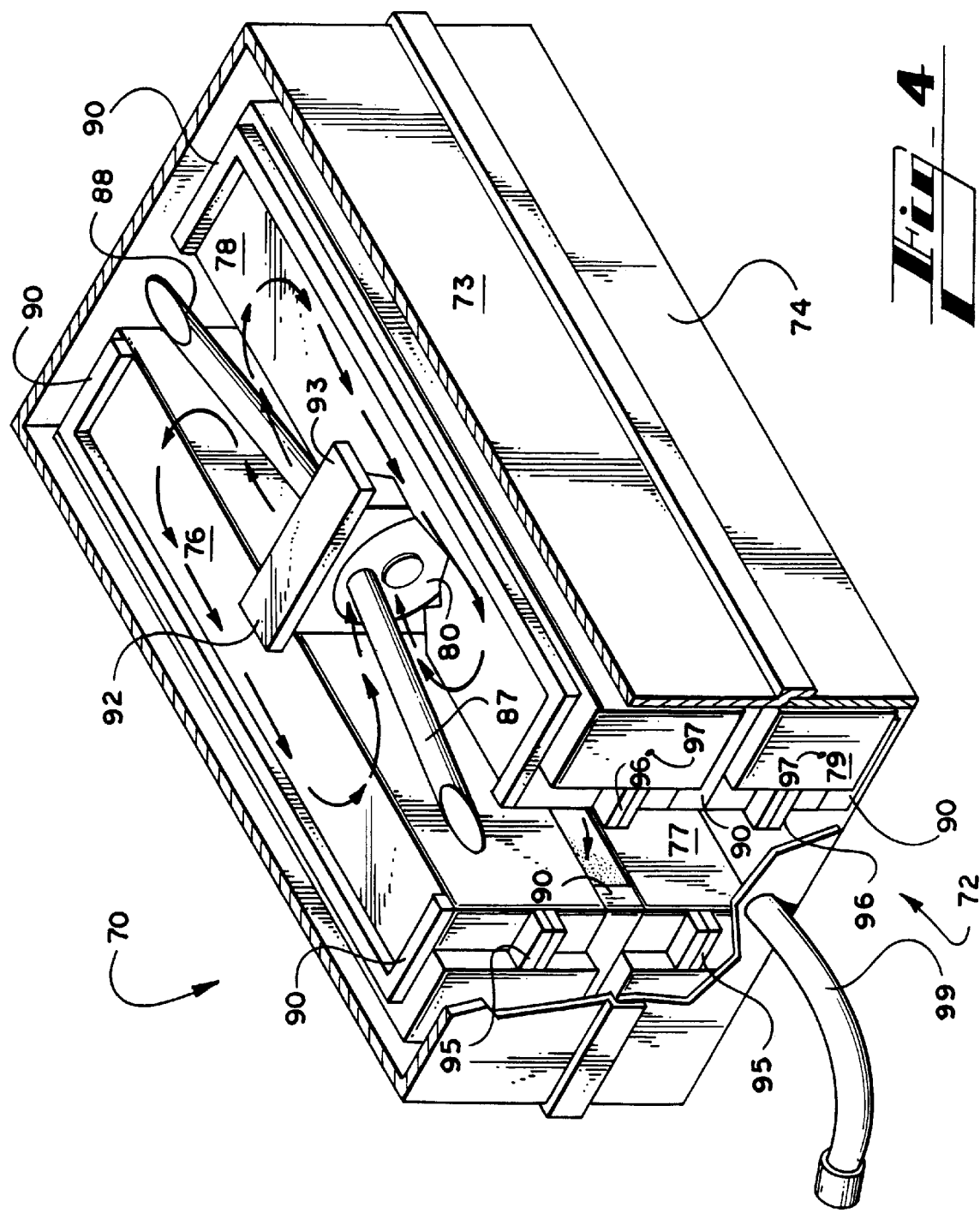
Fig_4

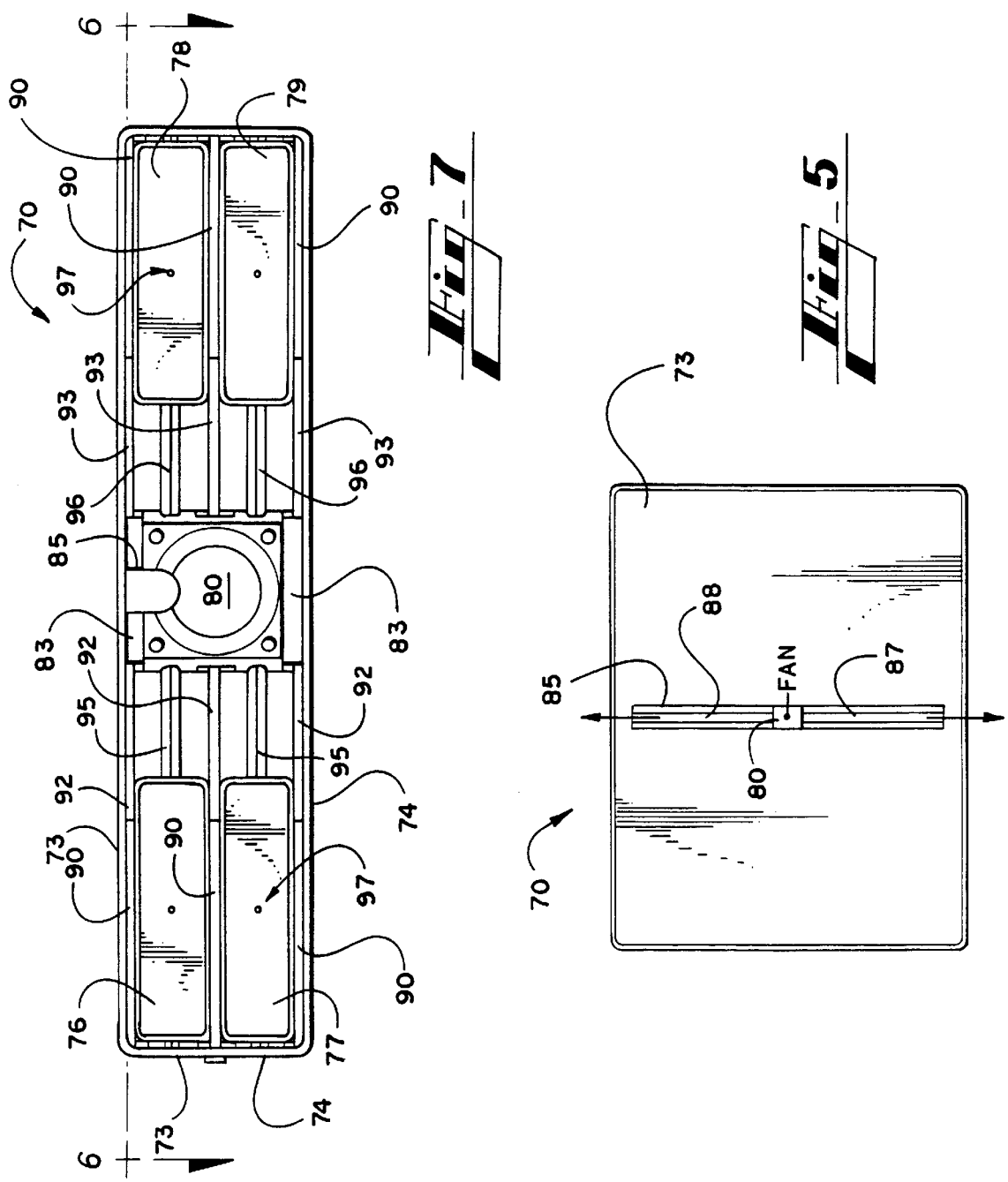

DIFFUSION CONTROLLED AIR VENT AND RECIRCULATION AIR MANAGER FOR A METAL-AIR BATTERY

RELATED APPLICATIONS

This application is a continuation-in-part of application Ser. No. 08/544,707, which was filed on Oct. 18, 1995 and issued as U.S. Pat. No. 5,691,074 on Nov. 25, 1997.

TECHNICAL FIELD

The present invention relates generally to batteries, and more particularly relates to a ventilation system and air manager system for a metal-air battery.

BACKGROUND OF THE INVENTION

Metal-air battery cells include an air permeable cathode and a metallic anode separated by an aqueous electrolyte. During discharge of a metal-air battery, such as a zinc-air battery, oxygen from the ambient air is converted at the cathode to hydroxide, zinc is oxidized at the anode by the hydroxide, and water and electrons are released to provide electrical energy. Metal-air batteries have a relatively high energy density because the cathode utilizes oxygen from ambient air as a reactant in the electrochemical reaction rather than a heavier material such as a metal or metallic composition. Metal-air battery cells are often arranged in multiple cell battery packs within a common housing to provide a sufficient amount of power output. The result is a relatively light-weight battery.

To operate a metal-air battery cell, it is necessary therefore to provide a supply of oxygen to the air cathodes of the cells. Some prior systems sweep a continuous flow of new ambient air across the air cathodes at a flow rate sufficient to achieve the desired power output. Such an arrangement is shown in U.S. Pat. No. 4,913,983 to Cheiky. Cheiky uses a fan within the battery housing to supply a flow of ambient air to a pack of metal-air battery cells. When the battery is turned on, an air inlet and an air outlet are opened and the fan is activated to create the flow of air into, through, and out of the housing.

One problem with a metal-air battery is that the ambient humidity level can cause the battery to fail. Equilibrium vapor pressure of the metal-air battery results in an equilibrium relative humidity that is typically about 45 percent. If the ambient humidity is greater than the equilibrium humidity within the battery housing, the battery will absorb water from the air through the cathode and fail due to a condition called flooding. Flooding may cause the battery to burst. If the ambient humidity is less than the equilibrium humidity within the battery housing, the metal-air battery will release water vapor from the electrolyte through the air cathode and fail due to drying out. The art, therefore, has recognized that an ambient air humidity level differing from the humidity level within the battery housing will create a net transfer of water into or out of the battery. These problems are particularly of concern when the battery is not in use, because the humidity tends to either seep into or out of the battery housing over an extended period of time.

Another problem associated with metal-air batteries is the transfer of carbon dioxide from ambient air into the battery cell. Carbon dioxide tends to neutralize the electrolyte, such as potassium hydroxide. In the past, carbon dioxide absorbing layers have been placed against the exterior cathode surface to trap carbon dioxide. An example of such a system is shown in U.S. Pat. No. 4,054,725.

Maintaining a battery cell with proper levels of humidity and excluding carbon dioxide has generally required a sealed battery housing. As discussed above, however, prior art systems such as that disclosed by Cheiky, have used a fan of some sort to force ambient air through the battery housing during use. Large openings are provided to permit the in-flow and out-flow of air. These openings are generally sealed during non-use by a mechanical air door. If the air door is not present or not shut during non-use, large amounts of ambient air would seep into the housing. This flow of air would cause the humidity and carbon dioxide problems within the housing as discussed above. The oxygen in the ambient air also would cause the cell to discharge, thereby leading to "leakage" current and a reduction in cell efficiency and lifetime.

Even with the use of air doors, however, a certain amount of oxygen and contaminates tend to seep into the cell during non-use. Some leakage current is therefore inevitable. Although the air doors limit this leakage current and the other problems discussed above, the use of the air doors increases the complexity of the battery housing itself and increases the cost and time of manufacture of the overall battery.

Air doors have not been needed in some applications of metal-air cells, such as shown in include U.S. Pat. No. 4,118,544 to Przybyla. Przybyla describes a primary metal-air button cell used with watches and hearing aids. Such cells operate during a single, continuous discharge at very low current levels. In essence, Przybyla relies upon the use of continuous "leakage current" to power devices with very low current demands.

Metal-air cells typically are designed to have a relatively large air electrode surface, so that as large a power output as possible can be obtained from a cell of a given volume and weight. Once air is ventilated into a metal-air battery housing, a goal has been to distribute the oxygen-bearing air uniformly and efficiently to all air electrode surfaces. Recirculation air managers including fans within the battery housing have been developed to distribute air within the housing while keeping the volume of make-up air as low as practicable.

However, in multiple cell systems, air distribution paths typically have extended from a fan, positioned along a periphery of the housing adjacent to an air door, for a lengthy distance over all of the air electrode surfaces. An example is shown in U.S. Pat. No. 5,387,477. Oxygen is depleted from the air stream so that oxygen concentration at the end of the distribution path often has fallen below a level desired for optimal power production from all the cells. Systems that solve this problem by blowing outside air over the cells and exhausting it immediately without recirculation are subject to the flooding or drying out problems described above.

Thus, there has been a need for a practical air manager system for a metal-air battery without mechanical air doors or other mechanical sealing methods to prevent diffusion therethrough when the battery is not in use. The system should maintain a stable water vapor equilibrium across the air cathode of a metal-air cell while convectively providing new oxygen for operation of the cell at desired power levels in a simplified battery housing. There also has been a need for a recirculating air distribution system within a metal-air battery housing that minimizes the length of the air distribution path to the air electrode surfaces and minimizes the variation of the concentration of oxygen in the distributed air for all cells.

SUMMARY OF THE INVENTION

The present invention provides a ventilation system for a metal-air battery having a housing for enclosing at least one metal-air cell. The housing has at least one air inlet opening and at least one air outlet opening. A fan is positioned to force air into the air inlet opening and out of the air outlet opening when the fan is turned on. The openings are sized with a length in the direction through the thickness of the housing being greater than a width in the direction perpendicular to the thickness of the housing. The openings are unobstructed and are sized to eliminate substantially the air flow into the air inlet opening and out of the air outlet opening when the fan is turned off.

More particularly, the present invention provides a ventilation system for a metal-air battery having a preferred output current density with the fan on of about 50 to 200 ma per square inch of air cathode surface. Each opening preferably has a length to width ratio where the length is greater than about twice the width, with each opening having a length of about 0.3 to 1.5 inches and a width of about 0.03 to 0.3 inches. The openings are preferably sized in the aggregate to permit a flow rate therethrough of about 20 to 80 cubic inches per minute when forced by fan having a capacity of about 100 to 3000 cubic inches per minute.

When the fan is turned off, the openings are sized to slow the rate of diffusion therethrough such that the drain current density is less than 1 ma per square inch of air cathode surface. The preferred ratio of the output current density to the drain current density of the battery is at least 100 to 1. The flow rate with the fan off is preferably about 0.01 to 0.2 cubic inches per minute or less.

According to another aspect of the invention, a metal-air battery is provided that includes a recirculating air distribution system within a metal-air battery housing that minimizes the length of the air distribution path to the air electrode surfaces and minimizes the variation of the concentration of oxygen in the distributed air for all cells, by providing a fan within the battery housing positioned to distribute air to two separate sets of metal-air cells at the same time. In this configuration, all cells of both sets of cells receive air quickly, and the air received is of more uniform oxygen concentration because the air paths are shorter than in previous configurations utilizing the same number of cells.

In the housing of a battery embodying this aspect of the invention, a fan defines a flow axis from a negative pressure side of the fan to a positive pressure side of the fan. The battery further includes at least one ventilation opening in the housing; a plurality of metal-air cells within the housing, at least a first cell being located on a first side of the fan flow axis and at least a second cell being located on a second side of the fan flow axis; a first air path extending from the positive pressure side of the fan along an air electrode side of the first cell and to the negative side of the fan; and a second air path extending from the positive pressure side of the fan along an air electrode side of the second cell and to the negative side of the fan; the fan supplying air to both the first and second air paths at the same time.

The ventilation opening or openings utilized in this embodiment can be of the type described for the first embodiment, or of the type described in U.S. Pat. No. 5,356,729, or can be of the type utilizing an air door.

Preferably, two elongate passageways are ported to each side of the fan, and have a length and diameter selected to substantially eliminate diffusion therethrough when the fan is turned off.

Thus, it an object of the present invention to provide an improved ventilation system for a metal-air cell or battery.

It is a further object of the present invention to provide an improved method for supplying reactant air to a metal-air cell or battery.

It is a further object of the present invention to provide an air manager apparatus and method that maintains a more stable water vapor equilibrium across the air cathode of a metal-air cell while still providing new oxygen needed for operation of the cell at desired power levels.

It is a further object of the present invention to provide an air manager system that does not require a mechanical air door.

It is a still further object of the present invention to provide an air vent for a metal-air battery housing that substantially eliminates diffusion therein when the fan is turned off.

It is a further object of the present invention to provide a recirculating air distribution system within a metal-air battery housing that delivers oxygen-rich air to all cells in an efficient manner.

Other objects, features and advantages of the present invention will become apparent upon reviewing the following description of preferred embodiments of the invention, when taken in conjunction with the drawings and the appended claims.

BRIEF DESCRIPTION OF THE DRAWINGS

FIG. 1 is a diagrammatic top view of the battery housing embodying the present invention, showing the position of the cells, the fan, and the air openings, in combination with the direction of the flow of air with respect to the housing.

FIG. 2 is a vertical cross sectional view taken along line 2—2 of FIG. 1.

FIG. 3 is a diagrammatic pictorial view of a ventilation opening.

FIG. 4 is a pictorial view of a second embodiment of a battery incorporating the present invention, with portions broken away to show interior detail.

FIG. 5 is a top plan view of the battery of FIG. 4.

FIG. 7 is an end view of the interior of the battery of FIG. 4, taken along line 7—7 of FIG. 6.

DETAILED DESCRIPTION

Figures 6, 8:
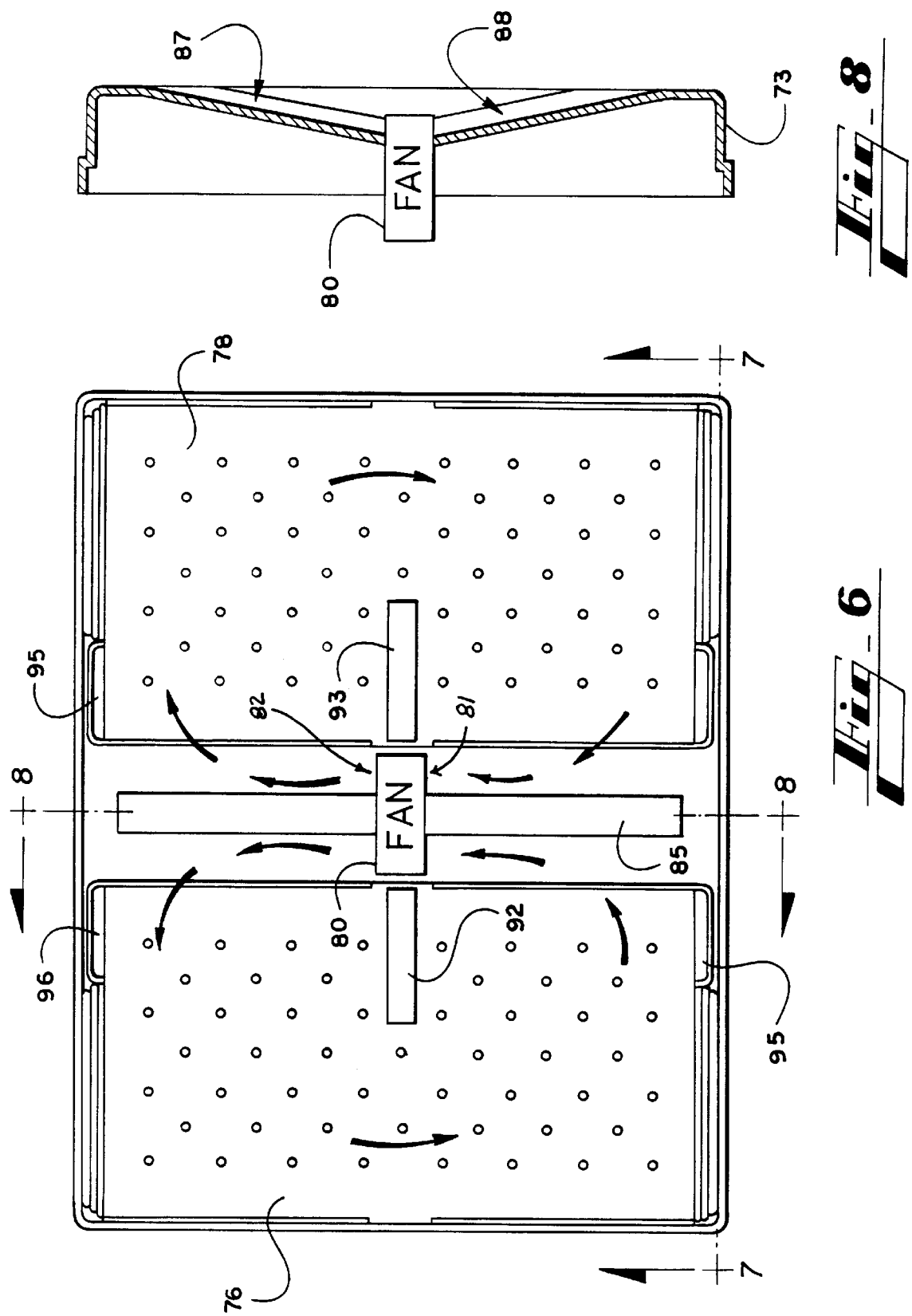
FIG. 6 is a top view of the interior of the battery of FIG. 4, taken along line 6—6 of FIG. 7.
FIG. 8 is a side cross sectional view of the cover portion of the housing of the battery of FIG. 4, taken along line 8—8 of FIG. 6.

Referring now in more detail to the drawings, in which like numerals refer to like parts throughout the several views, FIGS. 1 and 2 show a metal-air battery pack 10 embodying the present invention. The metal-air battery 10 may be similar to that disclosed in commonly-owned U.S. Pat. No. 5,641,588 or in commonly owned U.S. Pat. No. 5,356,729 to Pedicini, which are incorporated herein by reference. The metal-air battery 10 includes a plurality of cells 15 enclosed within a housing 20. Although the use of the invention with a zinc-air battery is disclosed, this invention should be understood as being applicable to other types of metal-air battery cells.

The housing 20 isolates the cells 15 from the outside air with the exception of a plurality of ventilation openings 25. In the embodiment shown in FIGS. 1 and 2, a single air inlet opening 30 and a single air outlet 35 are utilized. As described below, the number of openings 25 is not as important as the aggregate size of the openings 25 in connection with the shape of each opening 25. The housing 20 may be any type of conventional, substantially air-tight structure.

A circulating fan 40 is provided for convective air flow both in and out of the housing 20 and to circulate and mix the gases within the housing 20. The arrows 45 shown in FIG. 1 represent a typical circulation of the gases into, out of, and within the housing 20 to provide reactant air to the cells 15. The capacity of the fan 40 depends upon the size of the housing 20 and the power demands of the battery 10. The term "fan 40" as used herein is intended to mean any device used to move air.

The fan 40 may be positioned within the housing 20 or adjacent to the housing 20 in communication with one of the openings 25. If the fan 40 is located within the housing 20, the ventilation openings 25 are positioned such that the inlet opening 30 and the outlet opening 35 are positioned on opposite sides of the fan 40. The only requirement for the positioning within the housing 20 of the fan 40 and the openings 25 is that they are in sufficiently close proximity to each other to create a convective air flow into, through, and out of the housing 20. The fan 40 may be mounted within or adjacent to the housing 20 in any convenient manner. The fan 40 is generally sealed into place by a gasket 41 or other conventional means to ensure that the low pressure and high pressure sides of the fan 40 are isolated from one another.

As is shown in FIG. 2, the plurality of cells 15 within housing 20 are arranged such that a reactant air plenum 50 is positioned under the cells 15. The air plenum 50 generally defines an air plenum inlet 55, an air passageway 60, and an air plenum outlet 65. The fan 40 is generally positioned between and isolates the air plenum inlet 55 from the air plenum outlet 65 for efficient air flow through the housing 20. An example of an air plenum design is shown in FIG. 4 of commonly-owned U.S. Pat. No. 5,641,588.

As is shown in FIG. 3, the ventilation openings 25 are preferably sized such that their length 26, i.e., the direction through the thickness of the housing 20, is greater than their width 27, i.e., the direction perpendicular to the thickness of the housing 20. By using a large enough ratio between the length 26 and the width 27 for the ventilation openings 25, it has been found that diffusion of air through the openings 25, without the assistance of the fan 40, is substantially eliminated. By "substantially eliminated," it is meant that the rate of diffusion of oxygen or contaminates through the openings 25 is so slow that humidity transfer or drain current is sufficiently small and has little appreciable impact on the efficiency or lifetime of the battery 10. The openings 25 are sufficiently long and narrow to provide a barrier to diffusion of gases therethrough when the fan 40 is turned off.

This required ratio between length 26 and width 27 is at least about two to one. These ratios are sufficient to prevent appreciable diffusion through the openings 25 when the fan 40 is turned off while permitting convective air flow therethrough when the fan 40 is turned on. The use of larger ratios between length 26 and width 27 is preferred. Depending upon the nature of the battery 10, the ratio can be more than 200 to 1.

The preferred total open area of the openings 25 depends upon the desired capacity of the battery 10. Any number of openings 25 can be used such that aggregate open area of all of the openings 25 equals this preferred total open area, with each such opening 25 having the same or similar ratios of length 26 to width 27 to provide the barrier functions. Although the use of circular openings 25 is disclosed, any conventional shape having the required ratios may be employed. Further, the openings 25 may be straight or curved in length.

In use, ambient air is drawn into the air inlet 30 by pull of the fan 40 when the fan 40 is turned on. As is shown by the arrows 45 in FIG. 1, the air is then drawn through the fan 40 and into the air plenum 50. The air enters the air plenum 50 through air plenum inlet 55, travels though the pathway 60 to provide a reactant air flow for the cells 15, and exits via the air plenum outlet 65. The air is then again drawn into the fan 40 where it either mixes when fresh incoming ambient air or is forced out of the housing 20 via air outlet 35. When the fan 40 is turned off, the rate of diffusion of air through the openings 25 is reduced to acceptable levels such that a mechanical air door is not required.

By way of example, in a preferred embodiment of a battery pack 10 designed to power a portable computer (not shown), an 8 volt battery 10 with 8 battery cells 15 is used (an up-converter (not shown) also may be used). Each cell 15 has an output of about 1 volt or slightly higher at about 1 to 4 amps. Each cell 15 has an exposed cathode area (not shown) of about 18 to 22 square inches for a total exposed cathode area of about 144 to 176 square inches. The battery 10 therefore has a current density of about 50 to 200 ma per square inch of cathode surface when the fan is turned on. The fan 40 has a capacity of about 100 to 3000 cubic inch per minute.

In order to pull a gas flow through the housing 20 of about 20 to 80 cubic inches per minute when the fan is turned on, the openings 25 are sized with a length 26 of about 0.3 to 1.5 inches, with about 1.0 inch preferred, and a width 27 of about 0.03 to 0.3 inches, with about 0.09 inch preferred. The total open area of each opening 25 is therefore about 0.0007 to 0.5 square inches, with a preferred ratio of length 26 to width 27 of about 10 to 1.

When the fan 40 is turned off, the gas flow rate is reduced to about 0.01 to 0.2 cubic inches per minute or less, with a leakage current of less than 1 ma. The ratio of output current density with the fan 40 turned on to drain current density with the fan 40 turned off is expected to be at least 100 to 1 in an efficient battery 10.

It is understood that the respective sizes, capacities, densities, flow rates, and other parameters discussed above are dependent upon the overall size and power requirements of the battery 10. For example, output current density could easily run in the range of 10 to 500 ma per square inch of air cathode surface area in a conventional battery 10. It is also understood that other types of electrical devices besides computer equipment may be powered by the battery 10.

The openings 25 are also preferably sized to preferentially diffuse oxygen out of the housing 20 during recharge. Oxygen is generated at the cathode (not shown) during recharge. The openings 25 are sized in the aggregate to force oxygen out of the housing 20 when the partial pressure of oxygen within the housing 20 is at a level above the partial pressure of oxygen outside the housing 25.

A second embodiment of a battery 70 embodying the present invention is shown in FIGS. 4–8. The battery 70 includes a housing 72 in two parts sealed together at a central joint: a cover portion 73 and a bottom portion 74. Within the housing 72 four cells 76–79 are positioned in two stacks of two cells each. Cells 76 and 77 form a left stack, as viewed in FIG. 7, and cells 78 and 79 form a right stack spaced apart from the left stack. A fan 80 is positioned in the elongate space between the left and right stacks. The fan is oriented to direct air along the space between the stacks, as shown by the arrows in FIG. 6, from a negative pressure side 81 of the fan 80 to a positive pressure side 82. The direction of air flow through the fan is referred to herein as the flow axis of the fan 80. Thus, the left stack, cells 76 and 77, are located on the left side of the flow axis, and the right stack, cells 78 and 79, are located on the opposite side of the flow axis. The fan 80 preferably is located approximately midway along the length of the cells, and the spaces between the fan and the cover 73 and bottom 74 of the housing 72 are filled by gaskets 83.

As best shown in FIGS. 5 and 8, the cover portion 73 of the housing 72 defines a central groove 85 which is deep at the center of the cover 73 and becomes more shallow as the groove approaches the opposite edges of the cover. The groove 85 parallels the flow axis of the fan 80. As shown in FIG. 8, a peripheral portion of the fan 80 protrudes into the groove at the center of the groove. A pair of elongate diffusion tubes 87 and 88 lie in the groove, one on each side of the fan, so that one end of each tube is ported to a position adjacent to the fan, with the tubes aligned with one another on opposite sides of the fan. The tubes extend upwardly along the groove in opposite directions away from the fan, and terminate with their other ends near the main surface of the cover 73.

Thus, the inner ends of the tubes 87, 88 lie next to the fan in the path of fan blades, facing one another through an outer sector of an active area of the fan. The tubes 87, 88 have a cross sectional area and length selected to substantially eliminate air flow into the housing when the fan is turned off, similar to the ventilation openings 25 of the first embodiment described above. In the embodiment shown in FIGS. 4–8, the tubes each preferably have an inside diameter of about 3/16 inch (3 to 6 mm) and a length of about 7/8 inch (18 to 25 mm). However, any dimensions falling within the ranges and characteristics described above for the ventilation openings 25 may be utilized. Those skilled in the art will appreciate that the length of the passageways formed by the tubes 87, 88 may be increased, and/or the diameter decreased, if the static pressure of the fan is increased. A balance between the static pressure of the fan and the dimensions of the passageways can be found, at which air flow into the housing will be sufficiently reduced when the fan is turned off.

It should also be understood that the passageways provided by the tubes 87, 88 may be provided instead by openings molded into the cover 73, or by enclosing the groove 85.

The cells 76–79 may be dual air electrode cells of the type described in U.S. Pat. No. 5,569,551, filed Apr. 24, 1995, which is incorporated herein by reference. Such cells have air cathodes adjacent to both surfaces of the cell, and zinc anodes between the cathodes. Each cell includes a cathode terminal tab 95 and an anode terminal tab 96, as shown in U.S. Pat. No. 5,569,551 and a hydrogen vent 97 formed in the side of the cell. The cells 76–79 are spaced apart from each other in their stacks and also from the cover 73 and bottom 74 of the housing by a plurality of U-shaped peripheral gaskets 90 that extend around the periphery of the housing except for the central space between the cell stacks, and by central gaskets 92 and 93. The left central gaskets 92 extend from the fan over the cell 76, under the cell 77, and between the cells 76 and 77. The right central gaskets 93 extend from the fan over the cell 78, under the cell 79, and between the cells 78 and 79. The gaskets 92 and 93 extend from the fan about three-fifths of the width of the cells. The gaskets 90, 92 and 93 assure that space is provided for air flow adjacent to all the air cathodes of the cells, and also direct air flow in such spaces.

In operation, the fan circulates air along two separate air flow paths, at the same time, as shown by the two circles of arrows in FIGS. 4 and 6. The air pressurized on the positive side of the fan flows from the central space both left and right into the spaces between the cells of each stack, and between the cells and the housing. The central gaskets 92, 93 guide the air to the outer edge of the air cathodes, and the peripheral gaskets 90 confine the air to the area of the air cathodes. After passing the central gaskets, the air flows back around to the negative side of the fan for recirculation. New, or make up, air is admitted through the tube 87 on the negative side of the fan, while a similar amount of air is expelled through the tube 88 on the positive side of the fan.

The fan blades mix the incoming air with air within the housing, and, force most of the incoming air into the recirculating air flow paths. Although the fan preferably is midway along the length of the cells, it may be positioned at any point along the space between the stacks from which the separate air flow paths may be maintained at the same time. While the fan is turned on, a flow of air occurs in the tubes 87, 88; but when the fan is turned off, the flow in the tubes is so small it does not result in significant discharge of the cells. As a result of the separate air flow paths, all cells of both stacks of cells receive air quickly, and the air received is of more uniform oxygen concentration because the air paths are shorter than in previous configurations utilizing the same number of cells. In other words, when the air flow reaches the last air electrode area prior to returning to the fan, the air has traversed a smaller cumulative air electrode area, and therefore is not as depleted of oxygen as was the case in prior systems.

The cells are wired together in series in a manner known to those skilled in the art. The fan is connected to be operated by the cells. A cable 99 extends from the housing to connect the cells and fan to recharge circuitry (not shown) and an upconverter (not shown). The upconverter raises the voltage output of the battery, for example about four volts, to the level needed to operate the fan, for example about ten volts.

Although the embodiment of FIGS. 4–8 has been described in connection with dual air electrode cells, it should be understood that this invention is advantageous in batteries of all types of metal-air cells. Furthermore, the number of cells on each side of the flow axis of the fan may be one, or may be as many as may be serviced adequately by the fan. Such cells may be stacked, as shown, or oriented in some other configuration.

It should be understood that the foregoing relates only to preferred embodiments of the present invention, and that numerous changes may be made therein without departing from the spirit and scope of the invention as defined by the following claims.

What is claimed is:

1. A metal-air battery, comprising:
   a housing;
   a fan defining a flow axis from a negative pressure side of said fan to a positive pressure side of said fan;
   at least one ventilation opening in said housing;
   a plurality of metal-air cells within said housing, at least a first cell being located on a first side of said fan flow axis and at least a second cell being located on a second side of said fan flow axis;
   a first air path extending from said positive pressure side of said fan along an air electrode side of said first cell and to said negative pressure side of said fan;

a second air path extending from said positive pressure side of said fan along an air electrode side of said second cell and to said negative pressure side of said fan;

said fan supplying air to both said first and second air paths at the same time.

2. The apparatus of claim 1, wherein said air paths are defined between the air electrode sides of said cells and a wall of said housing.

3. The apparatus of claim 1, wherein said plurality of metal-air cells comprises:

a plurality of said first cells in a first stack, said first cells spaced apart vertically to define said first air path therebetween;

a plurality of said second cells in a second stack, said second cells spaced apart vertically to define said second air path therebetween;

said first and second stacks being spaced apart horizontally within said housing, and said fan being positioned in a space formed between said stacks.

4. The apparatus of claim 3, further comprising third and fourth air paths defined between the top and bottom of said first stack and walls of said housing; and fifth and sixth air paths defined between the top and bottom of said second stack and walls of said housing; said fan supplying air to all said air paths at the same time.

5. The apparatus of claim 3, wherein said at least one ventilation opening in said housing comprises a pair of elongate ventilation passageways ported to positions adjacent to said fan, one on the positive pressure side of said fan and one on the negative pressure side of said fan.

6. The apparatus of claim 5, wherein said ventilation passageways terminate facing one another through an outer sector of an active area of said fan.

7. The apparatus of claim 6, wherein said ventilation passageways have a cross sectional area and length operative to substantially eliminate air flow into said housing when said fan is turned off.

8. The apparatus of claim 1, wherein said at least one ventilation opening in said housing comprises a pair of elongate ventilation passageways ported to positions adjacent to said fan, one on the positive pressure side of said fan and one on the negative pressure side of said fan.

9. The apparatus of claim 8, wherein each said passageway has a length to width ratio of between about 2 to 1 and 200 to 1.

10. The apparatus of claim 9, wherein each said passageway has a length from 3 to 6 mm and a width from 18 to 25 mm.

11. The apparatus of claim 10, wherein said passageways limit said metal-air battery to a drain current density with said fan turned off of less than 1 ma per square inch of air electrode surface.

12. The apparatus of claim 10, wherein said passageways are sized in the aggregate to permit a flow rate therethrough with said fan on of about 20 to 80 cubic inches per minute.

13. The apparatus of claim 12, wherein said passageways are sized in the aggregate to permit a flow rate therethrough with said fan off of about 0.01 to 0.2 cubic inches per minute or less.

14. The apparatus of claim 1, wherein said housing defines a single air inlet passageway and a single air outlet passageway.

15. A method for controlling air flow in a metal-air battery, comprising the steps of:

confining at least two metal-air cells within a housing, said housing having a fan therein, at least a first cell being located on a first side of a flow axis of said fan and at least a second cell being located on a second side of said fan flow axis;

directing air from said fan at the same time along:

a first air path extending from said positive pressure side of said fan along an air electrode side of said first cell and to said negative pressure side of said fan; and a second air path extending from said positive pressure side of said fan along an air electrode side of said second cell and to said negative pressure side of said fan.

16. A ventilation system for providing reactant air to a metal-air battery, comprising:

a housing for enclosing at least one metal-air cell;

at least one elongate inlet ventilation passageway having an upstream end communicating with the environment exterior to said housing and a downstream end communicating with the interior of said housing, wherein the length of said inlet ventilation passageway is greater than about twice the width of said inlet ventilation passageway;

at least one elongate outlet ventilation passageway having an upstream end communicating with the interior of said housing and a downstream end communicating with the environment exterior to said housing, wherein the length of said outlet ventilation passageway is greater than about twice the width of said outlet ventilation passageway; and an air moving device for moving air into said housing through said inlet ventilation passageway and moving air out of said housing through said outlet ventilation passageway, wherein said ventilation passageways are unsealed while said air moving device is off.

17. The apparatus of claim 16, wherein said air moving device comprises a fan within said housing, and said downstream end of said inlet ventilation passageway is proximate to the negative pressure side of said fan and said upstream end of said outlet ventilation passageway is proximate to the positive pressure side of said fan.

18. The apparatus of claim 16, wherein said air moving device comprises a fan within said housing, and said downstream end of said inlet ventilation passageway and said upstream end of said outlet ventilation passageway face one another through an outer sector of an active area of said fan.

19. The apparatus of claim 16, wherein said ventilation passageways have a cross sectional area and length operative to substantially eliminate air flow into said housing when said air moving device is turned off.

20. The apparatus of claim 16, wherein each said ventilation passageway has a length to width ratio of between about 2 to 1 and 200 to 1.

21. The apparatus of claim 16, wherein each said ventilation passageway has a width from 3 to 6 mm and a length from 18 to 25 mm.

22. The apparatus of claim 16, wherein said passageways are sized in the aggregate to permit a flow rate therethrough with said air moving device on of about 20 to 80 cubic inches per minute.

23. The apparatus of claim 16, wherein said passageways are sized in the aggregate to permit a flow rate therethrough with said air moving device off of about 0.01 to 0.2 cubic inches per minute or less.

24. A metal-air battery, comprising:

a housing;

an air moving device operative when on to move air within said housing;

at least one metal-air cell within said housing;

at least one inlet communicating between the environment exterior to said housing and the interior of said housing; and at least one outlet communicating between the interior of said housing and the environment exterior to said housing, wherein said metal-air battery provides a discharge mode during which said air moving device moves air through said inlet and said outlet to supply air to said metal-air cell so that said metal-air battery is capable of generating an output current, and an idle mode during which said air moving device is off, and wherein said inlet and said outlet are sized to limit discharge of said metal-air battery when said air moving device is off to a drain current that is smaller than said battery output current.

25. The apparatus of claim 24, wherein each of said inlet and said outlet have a length to width ratio where the length is greater than about twice the width.

26. The apparatus of claim 24, wherein said air moving device comprises a fan within said housing, and said fan defines a flow axis from a negative pressure side of said fan to a positive pressure side of said fan, wherein said metal-air cell is a first cell located on a first side of said fan flow axis and said metal-air battery further comprises at least a second cell located on a second side of said fan flow axis, wherein said metal-air battery further comprises a first air path extending from said positive pressure side of said fan along an air electrode side of said first cell and to said negative pressure side of said fan, and a second air path extending from said positive pressure side of said fan along an air electrode side of said second cell and to said negative pressure side of said fan, and wherein said fan supplies air to both said first and second air paths at the same time.

27. The apparatus of claim 24, wherein said metal-air battery is capable of having a drain current density with said air moving device turned off, and said inlet and said outlet are sized to limit said drain current density to less than 1 ma per square inch of air cathode surface, and wherein said metal-air battery is capable of having an output current density of about 10 to 500 ma per square inch of air cathode surface during said discharge mode.

28. The apparatus of claim 24, wherein said inlet and said outlet are sized to limit said drain current so that said drain current is smaller than said battery output current by at least a factor of 50.

29. The apparatus of claim 24, wherein said inlet and said outlet are sized to permit a flow rate therethrough with said air moving device on of about 20 to 80 cubic inches per minute and to permit a flow rate therethrough with said air moving device off of about 0.01 to 0.2 cubic inches per minute or less.

30. The apparatus of claim 29, wherein said air moving device has a capacity of about 100 to 3000 cubic inches per minute.

31. The apparatus of claim 24, wherein said metal-air battery comprises a plurality of cells that cooperate such that said metal-air battery can deliver a current of at least 7.2 amperes when said air moving device is turned on.

32. The apparatus of claim 24, wherein said metal-air battery is capable of having a drain current density while said air moving device is off, and said inlet and said outlet are sized to limit said drain current density to less than 1 ma per square inch of air cathode surface.

33. A method for controlling reactant air flow to a metal-air battery, comprising the steps of:

containing at least one metal-air cell within a housing comprising at least one inlet communicating between the environment exterior to the housing and the interior of the housing, and at least one outlet communicating between the interior of the housing and the environment exterior to the housing;

operating an air moving device to move air through the inlet and the outlet to provide air to the metal-air cell;

precluding operation of the air moving device so that the air moving device does not move air through the inlet and the outlet; and maintaining the inlet and the outlet in an unsealed state during the step of precluding operation of the air moving device, the inlet and the outlet being operative to restrict air flow through the inlet and the outlet during the step of precluding operation of the air moving device.

34. The method of claim 33, wherein:

the operating step comprises operating the air moving device to provide air to the metal-air cell so that the metal-air cell is capable of generating an output current;

the metal-air cell is capable of generating a drain current while the air moving device is not operating and the inlet and outlet are unsealed; and the inlet and the outlet are operative to limit the drain current to a level less than the output current.

35. The method of claim 34, wherein the inlet and the outlet are operative to limit the drain current so that the drain current is less than the output current by at least a factor of 50.

36. A metal-air battery, comprising:

a plurality of metal-air cells within a housing;

an inlet communicating between the environment exterior to said housing and the interior of said housing;

an outlet communicating between the interior of said housing and the environment exterior to said housing;

a fan operative when on to move air through said inlet and said outlet to provide air to said metal-air cells so that said battery is capable of generating an output current; and said inlet and said outlet being operative, while said inlet and said outlet are unsealed and said fan is off, to restrict air flow through said inlet and said outlet.

37. The metal-air battery of claim 36, wherein said inlet and said outlet are operative, while said inlet and said outlet are unsealed and said fan is off, to cause the rate of diffusion through said inlet and said outlet to be so slow that humidity transfer and drain current are sufficiently small as to have little appreciable impact on the performance of said battery.

38. The metal-air battery of claim 36, wherein said inlet and said outlet are operative to limit the drain current that said battery is capable of generating, while said inlet and said outlet are unsealed and said fan is off, to a level that is less than said output current of said battery.

39. The metal-air battery of claim 36, wherein said inlet and said outlet are operative to limit the drain current said battery is capable of generating, while said inlet and said outlet are unsealed and said fan is off, so that said drain current is less than said output current by at least a factor of 50.

40. The metal-air battery of claim 36, wherein said fan is within said housing.

41. A metal-air power supply, comprising:
at least one metal-air cell; and
at least one passageway capable of passing sufficient air to operate said cell to provide an output current density of at least 10 ma per square inch of air electrode surface when operatively associated with an operating air moving device, wherein said passageway is further operative, while unsealed and not under the influence of an operating air moving device, to restrict air flow through said passageway to limit a drain current density of said cell to less than 1 ma per square inch of air electrode surface.

42. The apparatus of claim 41, wherein said passageway comprises a tube having a length of at least 0.3 inches and a width of at least 0.03 inches.

43. The apparatus of claim 41, wherein:
said passageway is a first passageway; and
the apparatus further comprises a second passageway operative for directing air flow away from said metal-air cell when operatively associated with an operating air moving device, wherein said second passageway is operative, while unsealed and said air moving device is not operating, to restrict air flow through said second passageway.

44. The apparatus of claim 43, further comprising the air moving device, wherein said passageways are sized in the aggregate to permit a flow rate therethrough of at least about 20 cubic inches per minute while said air moving device is operating, and said passageways are sized in the aggregate to permit a flow rate therethrough of about 0.01 to 0.2 cubic inches per minute or less while unsealed and said air moving device is off.

45. A metal-air power supply, comprising:
at least one air electrode isolated from ambient air except through at least one elongate passageway;
at least one anode and electrolyte forming at least one electrochemical cell with said air electrode; and
at least one air moving device operative when on to move air through said passageway to provide reactant air to said air electrode;
said passageway being operative, while unsealed and said air moving device is off, to restrict air flow through said passageway.

46. The apparatus of 45, wherein said passageway comprises a tube and the length of said tube is greater than the width of said tube.

47. The apparatus of 45, wherein:
while said air moving device is on, said cell is capable of having an output current density; and
while said air moving device is off, said cell is capable of having a drain current density, and said passageway is operative to limit said drain current density so that said drain current density is smaller than said output current density by at least a factor of 50.

48. The apparatus of 47, wherein said output current density is at least 10 ma per square inch of air electrode surface.

49. A metal-air power supply, comprising:
a housing;
at least one air electrode, at least one anode, and electrolyte in said housing;
an air moving device; and
at least one elongate passageway that at least partially defines a communication path between the interior of said housing and the environment exterior to said housing,
wherein air flows through said passageway to supply air to said air electrode while said air moving device is operating, and
said passageway is operative, while unsealed and said air moving device is not operating, to restrict air flow through said passageway.

50. The apparatus of claim 49, wherein:
while said air moving device is operating said combination of said air electrode, said anode and said electrolyte is capable of having an output current density of at least 10 ma per square inch of air electrode surface; and
while said passageway is unsealed and said air moving device is not operating, said combination of said air electrode, said anode and said electrolyte is capable of having a drain current density, and said passageway is operative to limit said drain current density to less than 1 ma per square inch of air electrode surface.

51. The apparatus of claim 49, wherein while said air moving device is operating, said combination of said air electrode, said anode and said electrolyte is capable of having an output current density of at least 50 ma per square inch of air electrode surface.

52. The apparatus of claim 49, wherein said air moving device is positioned within said housing.

53. The apparatus of claim 49, wherein said passageway comprises a tube defining a length of at least 18 mm.

54. A ventilation system for a metal-air cell, comprising:
an air moving device; and
at least one elongate passageway that at least partially defines a communication path operable for communicating between an environment and the metal-air cell, wherein said passageway is operative to supply air flow through said passageway to the metal-air cell in response to operation of said air moving device, and said passageway is operative to restrict air flow through said passageway while said passageway is unsealed and said air moving device is not operating.

55. The apparatus of claim 54, wherein said passageway comprises a tube and the length of said tube is greater than the width of said tube.

56. The apparatus of claim 54, further comprising:
a metal-air cell; and
a housing defining an interior that contains said metal-air cell, wherein said passageway is positioned to at least partially define a communication path between the environment exterior to said housing and said interior of said housing.

57. The apparatus of claim 56, wherein said air moving device is a fan positioned within said housing.

58. A ventilation system for at least one metal-air cell, comprising:
a housing operable for at least partially enclosing at least one metal-air cell;
at least one passageway that at least partially defines a communication path capable of communicating between the environment exterior to said housing and the interior of said housing, wherein the length of said passageway is greater than the width of said passageway; and
an air moving device for moving air through said passageway between the interior of said housing and the environment exterior to said housing, wherein said passageway remains unsealed while said air moving device is off.

59. The apparatus of claim 58, wherein said passageway has a cross sectional area and length operative to substantially eliminate air flow into said housing when said air moving device is turned off.

60. The apparatus of claim 58, wherein said passageway comprises a tube having a length of at least 18 mm.

61. A method for controlling reactant air flow to a metal-air cell, comprising the steps of:

operating an air moving device to move air through at least one passageway that at least partially defines a communication path between an environment and the metal-air cell, so that air is supplied to the air electrode of the metal-air cell;

precluding operation of the air moving device so that the air moving device does not move air through the passageway to supply air to the metal-air cell; and maintaining the passageway in an unsealed state during the step of precluding operation of the air moving device, the passageway being operative to restrict air flow through the passageway.

62. The Method of claim 61, wherein the ratio of the output current that the metal-air cell can deliver during the operating step to the maximum drain current that the metal-air cell can deliver during the precluding step is greater than 50.

63. The Method of claim 61, wherein during the operating step the metal-air cell is capable of having an output current density of at least 10 ma per square inch of air electrode surface.

64. A metal-air power supply, comprising:

at least one metal-air cell; and at least one passageway having a length of at least about 0.3 inches and capable of passing sufficient air to operate said cell when operatively associated with an operating air moving device, wherein said passageway is further operative, while unsealed and not under the influence of an operating air moving device, to restrict air flow through said passageway.

* * * * *